United States Patent [19]

Miyano

[11] Patent Number: 5,460,050

[45] Date of Patent: Oct. 24, 1995

[54] SEMICONDUCTOR STRAIN SENSOR WITH WHEATSTONE BRIDGE DRIVE VOLTAGE COMPENSATION CIRCUIT

[75] Inventor: Soichiro Miyano, Tokyo, Japan

[73] Assignee: NEC Corporation, Tokyo, Japan

[21] Appl. No.: 264,946

[22] Filed: Jun. 24, 1994

[30] Foreign Application Priority Data

Jun. 24, 1993 [JP] Japan ..................................... 5-153175

[51] Int. Cl.⁶ ..................................................... G01L 9/06
[52] U.S. Cl. ................................ 73/766; 73/708; 73/721
[58] Field of Search ............................. 73/766, 765, 708, 73/721, 727; 338/3, 4

[56] References Cited

U.S. PATENT DOCUMENTS

| | | | |
|---|---|---|---|
| 4,611,163 | 9/1986 | Madeley | 323/367 |
| 5,048,343 | 9/1991 | Oboodi et al. | 73/766 |
| 5,146,788 | 9/1992 | Raynes | 73/708 |
| 5,253,532 | 10/1993 | Kamens | 73/708 |

FOREIGN PATENT DOCUMENTS

| | | |
|---|---|---|
| 61-44241 | 12/1979 | Japan. |
| 156361 | 4/1983 | Japan. |
| 61-16604 | 1/1986 | Japan. |
| 61-262981 | 11/1986 | Japan. |
| 1229565 | 5/1986 | U.S.S.R. ............................. 73/766 |

*Primary Examiner*—Richard Chilcot
*Assistant Examiner*—Eric S. McCall
*Attorney, Agent, or Firm*—Sughrue, Mion, Zinn, Macpeak & Seas

[57] ABSTRACT

A drive circuit for a strain sensor includes a Wheatstone bridge having semiconductor strain gauges. A temperature-dependent voltage generator generates a voltage having a predetermined ambient temperature dependency characteristic, a constant voltage generator generates a predetermined constant voltage, and a proportional voltage generator generates a voltage proportional to an externally supplied power source voltage. A voltage processor receives and arithmetically processes output voltages of the temperature-dependent voltage generator, the constant voltage generator and the proportional voltage generator to generate a bridge drive voltage which changes from a mid value to a predetermined voltage depending on a temperature proportional to the power source voltage. In an amplifier circuit for amplifying a strain output signal from the Wheatstone bridge, both the potentials across an AC coupling capacitor are kept to be equal at a steady-state operation. Detection sensitivity variations due to the temperature dependency characteristic of the strain gauges can be effectively compensated.

7 Claims, 4 Drawing Sheets

SEMICONDUCTOR STRAIN SENSOR WITH WHEATSTONE BRIDGE DRIVE VOLTAGE COMPENSATION CIRCUIT

BACKGROUND OF THE INVENTION (1) Field of the Invention

This invention relates to a strain sensor using semiconductor strain gauges for converting a mechanical strain into an electric signal as well as a drive circuit and an amplifier circuit for the same strain sensor, and more particularly to a strain sensor, which includes compensation means for compensating for the temperature dependency of the output voltage in the absence of signal and also compensation means for compensating for the temperature dependency of the detection sensitivity, as well as a drive circuit and an amplifier circuit for the same strain sensor.

(2) Description of the Related Art

Strain sensors are finding various industrial applications for converting various physical quantities such as forces, displacements, vibrations, shocks, pressures, etc. into electric quantities. Particularly, strain sensors using semiconductor strain gauges are finding rapidly increasing applications in pressure measurement, acceleration measurement, etc. because they are capable of making mass production, price reduction and size reduction since the circuit formation, shape processing and batch processing involved can be carried out all by semiconductor processing. Further, since it is possible today to carry out signal analysis inexpensively by using microcomputers, the applications have expanded to such fields as various control processes, in which a microcomputer reads out the strain sensor output signal as a digital signal through an analog-to-digital (AD) converter and executes analysis of the signal.

A strain sensor, in which semiconductor strain gauges utilizing the piezoelectric resistance effect of semiconductor are used as strain sensor elements, has high detection sensitivity and enables to make size reduction and mass production by using semiconductor processing. On the demerit side, however, the detection sensitivity varies greatly with temperature. In addition, the output voltage in the absence of signal is subject to great variations with temperature. Hitherto, there have been proposed various methods of compensation for such characteristic variations with temperature.

A known method of converting strain into electric quantity with a Wheatstone bridge having semiconductor strain gauges, will now be described with reference to FIG. 1. Referring to FIG. 1, there is shown a Wheatstone bridge 5 having semiconductor strain gauges 1 to 4. In this Wheatstone bridge circuit, the semiconductor strain gauges 1 to 4 are arranged such that with a strain given to each of them the resistances of the strain gauges 2 and 3 are changed inversely to the changes in the resistances of the strain gauges 1 and 4. The Wheatstone bridge 5 is supplied with a voltage E from a power supply source 7. When the resistances of the individual sides lose balance due to an impressed strain, a detection voltage corresponding to the resistance change of each side appears between detection voltage terminals 6. Denoting the current supplied from the power supply source 7 to the Wheatstone bridge 5 by I, the resistance of each semiconductor strain gauge in the strain-free state by R, the resistance change due to impressed stress by ΔR, the detection voltage S that appears between the detection voltage terminals 6 of the Wheatstone bridge 5 in correspondence to the impressed strain is $$S = I \times \Delta R$$

or $$S = E \times (\Delta R/R) \tag{1}$$

The resistance R of the semiconductor strain gauge is given in detail as follows:

$$R = R_0(1+\alpha T)\{1+\sigma \cdot \Pi(1+\beta)T\} \tag{2}$$

where $R_0$ represents the resistance in the strain-free state at a predetermined temperature, $\alpha$ represents the temperature coefficient of the resistance, $\sigma$ represents the stress generated in the strain gauge by the strain, $\Pi$ represents the piezoelectric resistance coefficient, $\beta$ represents the temperature coefficient of the piezoelectric resistance coefficient, and T represents the ambient temperature. The piezoelectric resistance coefficient is stringently a tensor quantity and varies in dependence on the angle between the crystal orientation of the semiconductor crystal and the stress. Usually, however, the strain gauges are arranged such that the stress to be measured acts in the direction in which the piezoelectric resistance coefficient is maximum. By developing the equation (2) and ignoring the second temperature term, the resistance R will be $$R = R_0(1+\alpha T) + R_0\{1+(\alpha+\beta)T\}\sigma \cdot \Pi \tag{3}$$

The first term of the right side of the equation (3) represents the resistance change of the strain gauge with temperature, and the second term represents the resistance change of the strain gauge due to strain. Both $\alpha$ and $\beta$ vary with the impurity concentration in the crystal of the semiconductor strain gauges. In the case of crystalline silicon, $\alpha$ is in the order of several hundreds to 3,000 ppm/°C., and $\beta$ is in the order of 1,000 to 3,000 ppm/°C. In the strain-to-electricity conversion using semiconductor strain gauges, therefore, the resistance of the strain gauge has a temperature characteristic as given by the equation (3). This dictates temperature characteristic compensation in the following two aspects.

1) There are variations in the gauge resistance changes with temperature as represented by the first term of the right side of the equation (3) among the gauge resistances of the individual bridge sides, so that the output voltage varies with temperature in the absence of signal.

2) The gauge resistance change due to strain as represented by the second term of the right side of the equation (3) varies with temperature, that is, the detection sensitivity varies with temperature.

The signal-free output voltage variations with temperature variations in 1) above are attributable to the fact that the temperature coefficients and polarity are respectively different among individual Wheatstone bridges. With respect to these variations, individual sensors require adjustment that is matched to their characteristics irrespective of any compensation system that may be adopted. This is a significant cause of hindrance of industrialization. Accordingly, in applications where the DC signal detection is unnecessary, a method of making AC coupling of the amplifier circuit is generally adopted in order to prevent propagation of the Wheatstone bridge output variations in the absence of signal to the sensor output because this method is most readily adoptable and inexpensive. In this case, only the temperature characteristic of the output in the absence of signal that is based on the amplifier circuit characteristics, has effects on the sensor output in the absence of signal, and a practically sufficiently small variation characteristic is very readily obtainable.

As for the detection sensitivity variations with temperature in 2) above, the Wheatstone bridge drive voltage is changed with temperature.

FIG. 2 is a circuit diagram showing a prior art example of strain sensor, in which compensation for the detection sensitivity variations with temperature and compensation for the output voltage variations in the absence of signal with temperature as noted above are provided. Referring to FIG. 2, a Wheatstone bridge drive circuit 81 having a transistor Q64 and resistors R69 and R70 has a function of varying a voltage $V_{81}$ applied to a Wheatstone bridge 5 with temperature. Denoting the power supply voltage by $V_{CC}$, the base-emitter voltage of the transistor Q64 by $V_{BE64}$ and the resistances of the resistors R69 and R70 by $R_{69}$ and $R_{70}$, the drive voltage $V_{81}$ for the Wheatstone bridge 5 is given as follows:

$$V_{81}=V_{CC}-\{(R_{69}+R_{70})/R_{70}\}\times V_{BE64} \quad (4)$$

This drive voltage V81 has a temperature characteristic with a positive temperature coefficient, such as an example of temperature characteristic as shown in FIG. 3, in which $R_{69}$=10 kΩ, $R_{70}$=5 kΩ, $V_{CC}$=5 V. The temperature coefficient of the piezoelectric resistance coefficient is negative, and the temperature coefficient of the voltage $V_{81}$ is adjustable by varying the ratio between the resistances $R_{69}$ and $R_{70}$. Thus, it is possible to compensate for the detection sensitivity variations with temperature of the Wheatstone bridge 5 by adjusting the temperature coefficient of the Wheatstone bridge drive voltage $V_{81}$.

Now, the amplifier circuit section shown in FIG. 2 will be described. The output signal of the Wheatstone bridge 5 is amplified in a first amplifier stage 60 which has operational amplifiers 65 and 66 and resistors R72 to R74, and is further amplified in a second amplifier stage 61 which has an operational amplifier 67 and resistors R75 to R77. Then, its components at frequencies lower than a predetermined frequency are blocked by a high-pass filter 62, which has a capacitor C80 and resistors R78 and R79, and then it is coupled through an operational amplifier 68 to an output terminal 8. A variable resistor R71 is provided for adjusting the output voltage of the Wheatstone bridge 5 in the absence of signal at a predetermined initial ambient temperature to 0 V.

The first amplifier stage 60 is generally called an instrumentation amplifier with the amplification factor $G_{60}$ given as $$G_{60}=(R_{72}+R_{73}+R_{74})/R_{72} \quad (5)$$

where $R_{72}$ to $R_{74}$ represent resistances of the resistors R72, R73 and R74. The second amplifier stage 61 serves as an inverting amplifier with its amplification factor $G_{61}$ given as $$G_{61}=R_{77}/R_{75} \quad (6)$$

where $R_{75}$ and $R_{77}$ represent resistances of the resistors R75 and R77. The low cut-off frequency $f_{CL62}$ of the high-pass filter 62 is given as $$F_{CL62}=(R_{78}+R_{79})/(C_{80}\times R_{78}\times R_{79}) \quad (7)$$

where $C_{80}$ represents the electrostatic capacitance of the capacitor C80 and $R_{78}$ and $R_{79}$ represent the resistances of the resistors R78 and R79. Thus, by appropriately selecting the respective values of $C_{80}$, $R_{78}$ and $R_{79}$, it is possible to obtain great attenuation of signal components at frequencies lower than a desired frequency. Thus, very low frequency signal components such as the output voltage variations of the Wheatstone bridge 5 in the absence of signal due to temperature variations, time-involved variations, etc. can be blocked so that they do not appear at all at the output terminal 8.

As shown above, the strain sensor shown in FIG. 2 comprises standard operational amplifiers, a transistor and passive elements, and this can be readily realized. In addition, the detection sensitivity variations due to the temperature dependency characteristic of the semiconductor strain gauges can be satisfactorily compensated for. Further, since the amplifier circuits are AC coupled therebetween, there is no need at all of taking the Wheatstone bridge output voltage variations in the absence of signal into considerations. Such a circuit construction, although it cannot be used for the measurement of pressure, mass, etc. that requires measurements of DC signal components, has a merit in that the circuit is simple for such applications as vibration measurement or the like where there is no need of DC signal detection.

However, the above prior art strain sensor has the following drawbacks.

a) When the power supply voltage supplied to the sensor is varied, the rate of change in the detection sensitivity becomes higher than the rate of change in the power supply voltage.

b) Because of the AC coupling of the amplifier circuits, a time as determined by the time constant of charging of the coupling capacitor is necessary until the operation is stabilized after the power source has been connected.

For example, with the strain sensor shown in FIG. 2, when the power supply voltage $V_{CC}$ is increased by 5%, the rate of change $\Delta V_{81}$ in the drive voltage $V_{81}$ for the Wheatstone bridge 5 is expressed as follows:

$$\Delta V_{81}=\frac{V_{CC}\times 1.05-\frac{R_{69}+R_{70}}{R_{70}}\cdot V_{BE64}}{V_{CC}-\frac{R_{69}+R_{70}}{R_{70}}\cdot V_{BE64}} \quad (8)$$

Thus, assuming here, for instance, $$V_{CC}=5\ V,\ \{(R_{69}+R_{70})/R_{70}\}\times V_{BE64}=1.4\ V,$$

$\Delta V_{81}$ is about 1.07. Thus, when the detection sensitivity is normalized with the power supply voltage, an increase of the power supply voltage $V_{CC}$ by 5% corresponds to an increase of the normalized sensitivity by about 2%.

The voltage $V_{68}$ at the output terminal 8 in FIG. 2 in the absence of signal is expressed as follows:

$$V_{68}=\{R_{79}/(R_{78}+R_{79})\}\times V_{CC} \quad (9)$$

Immediately upon the sensor power source connection, that is, switched-on, the mid point voltage of the Wheatstone bridge 5 is outputted, and subsequently it is changed to approach the above steady state voltage value at a time constant which is determined by the capacitor C80 and the resistors R78 and R79.

Of the two drawbacks discussed above, the drawback in a) may not be as such depending on the field of applications. However, in recently expanding applications where the sensor output signal is converted by an analog-to-digital (AD) converter into digital signal for signal processing in a microprocessor, the reference voltage of the analog-to-digital converter is often proportional to the power supply voltage, and in such a case it is required for the sensitivity of the sensor to be proportional to the power supply voltage.

As for the drawback in b) above, in applications requiring low frequency signal, the time constant of charging of the coupling capacitor is inevitably large, thus dictating a very long time until the sensor operation is stabilized after the connection of the power supply source, which is a significant problem.

SUMMARY OF THE INVENTION

An object of the invention is to provide a strain sensor, which has a sensitivity characteristic proportional to the power supply voltage, can obtain compensation for the detection sensitivity variations with temperature, and permits reduction of the time until stabilization of the operation after the power source connection while using an AC coupled amplifier for the Wheatstone bridge output voltage compensations in the absence of signal.

To attain the above object, the strain sensor according to the invention is provided with the following means.

First, to obtain a detection sensitivity characteristic proportional to the power supply voltage, the voltage applied to the Wheatstone bridge is made to equal the sum of a component proportional to the power supply voltage and a component variable with temperature. To this end, a Wheatstone bridge drive circuit is provided, which comprises:

a temperature-dependent voltage generator for generating and outputting a voltage having a predetermined ambient temperature dependency characteristic;

a constant voltage generator for generating and outputting a predetermined constant voltage;

a proportional voltage generator for generating and outputting a voltage proportional to an externally supplied power supply voltage; and a voltage processor for receiving and arithmetically processing an output voltage of the temperature dependent voltage generator, an output voltage of the constant voltage generator and an output voltage of the proportional voltage generator to generate and output a voltage of $(n_1 \cdot V_D + n_2 \cdot V_R - n_3 \cdot V_T)$ ($n_1$, $n_2$ and $n_3$ being positive constants), the output of the voltage processor being supplied between two voltage supply points of the Wheatstone bridge, with a relation $n_2 \cdot V_R = n_3 \cdot V_T$ being satisfied when the semiconductor strain gauges are at a predetermined temperature.

Next, to reduce the rising time when connecting the power supply source while providing an AC coupled amplifier circuit to compensate for the output voltage variations at a signal-free state, the amplifier circuit comprises:

a first operational amplifier for receiving a voltage supplied to a first input terminal as an input to one input terminal;

a second operational amplifier for receiving a voltage at an output terminal of the first operational amplifier as an input to one input terminal;

a DC voltage divider for dividing a voltage between a second input terminal and an output terminal of the second operational amplifier in a constant voltage division factor irrespective of the frequency;

an AC voltage divider including a series circuit having a resistor connected to a third input terminal and a capacitor connected to the output terminal of the second operational amplifier, for dividing a voltage between the third input terminal and the output terminal of the second operational amplifier, with frequency-dependency; and a third operational amplifier for receiving an input voltage supplied to the third input terminal as an input to a non-inverting input terminal, the said third operational amplifier outputting at an output terminal thereof a voltage which is fed-back to an inverting input terminal thereof through a resistor, the Wheatstone bridge outputting, between two voltage detection points, a strain signal which is amplified, the voltage at the voltage division point of the DC voltage divider being supplied as an input to the other input terminal of the first operational amplifier, the voltage at the voltage division point of the AC voltage divider being supplied as an input to the other input terminal of the second operational amplifier, the voltage at one of the voltage detection points of the Wheatstone bridge being supplied to the first input terminal, the voltage at the other voltage detection point of the Wheatstone bridge being supplied to the second and third input terminals, the voltage at the output terminal of the first operational amplifier being supplied as an input to the inverting input terminal of the third operational amplifier, an output voltage being provided from the output terminal of the third operational amplifier. With this arrangement, the potentials at the two ends of the AC coupled capacitor in the steady state thereof are made equal, thus dispensing with otherwise necessary time for the charging of the capacitor when connecting the power supply source.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF PREFERRED EMBODIMENT

Figure 4:
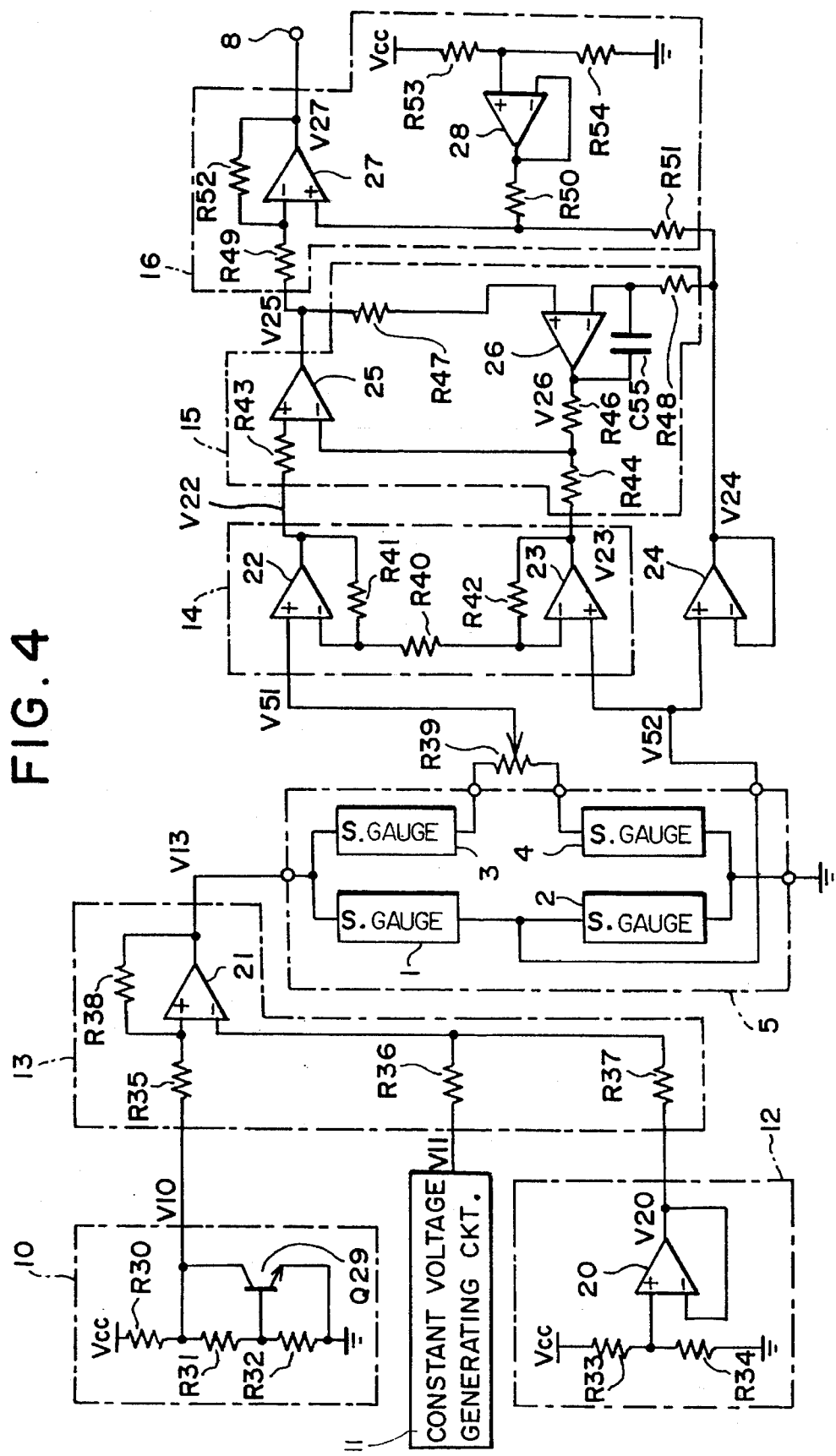
FIG. 4 is a circuit diagram for illustrating a first embodiment of the invention.

Now, a preferred embodiment of the invention will be described with reference to the drawings. FIG. 4 is a circuit diagram showing an embodiment of the invention.

Figure 1:
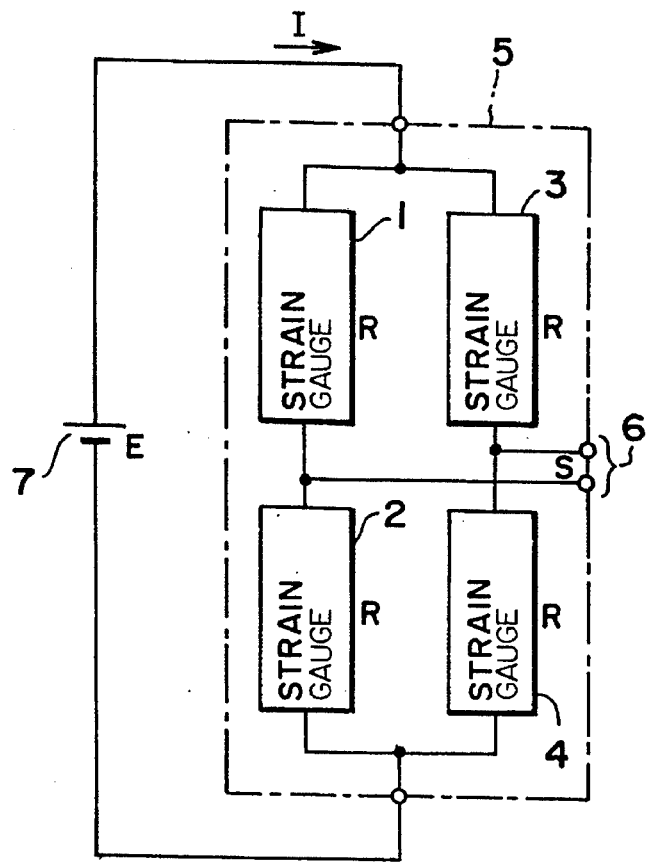
FIG. 1 is a circuit diagram for showing a conventional Wheatstone bridge using a semiconductor strain gauge.
Figure 3:
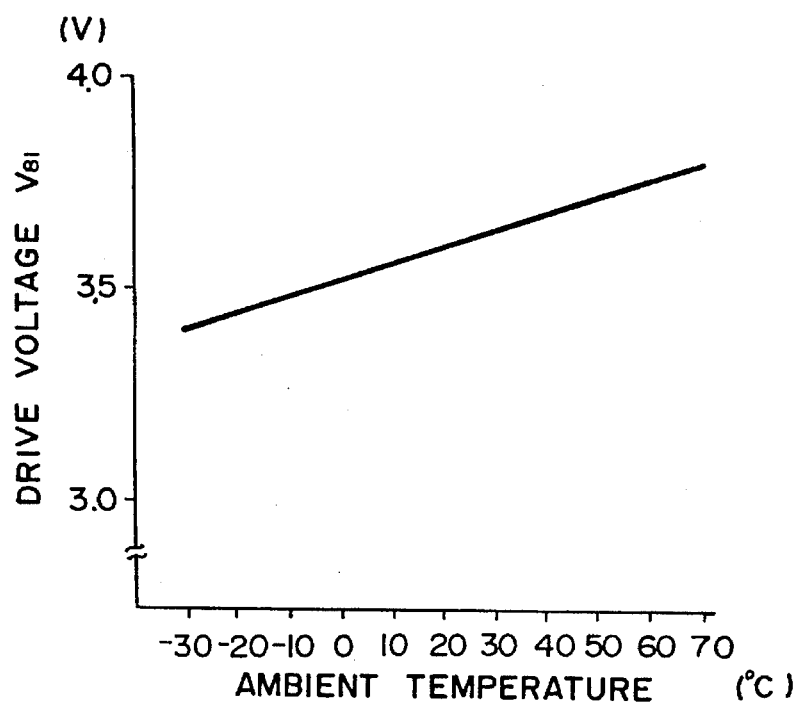
FIG. 3 is a diagram for showing temperature characteristics of output voltages of the Wheatstone bridge drive circuit in the conventional strain sensor shown in FIG. 2.
Figure 2:
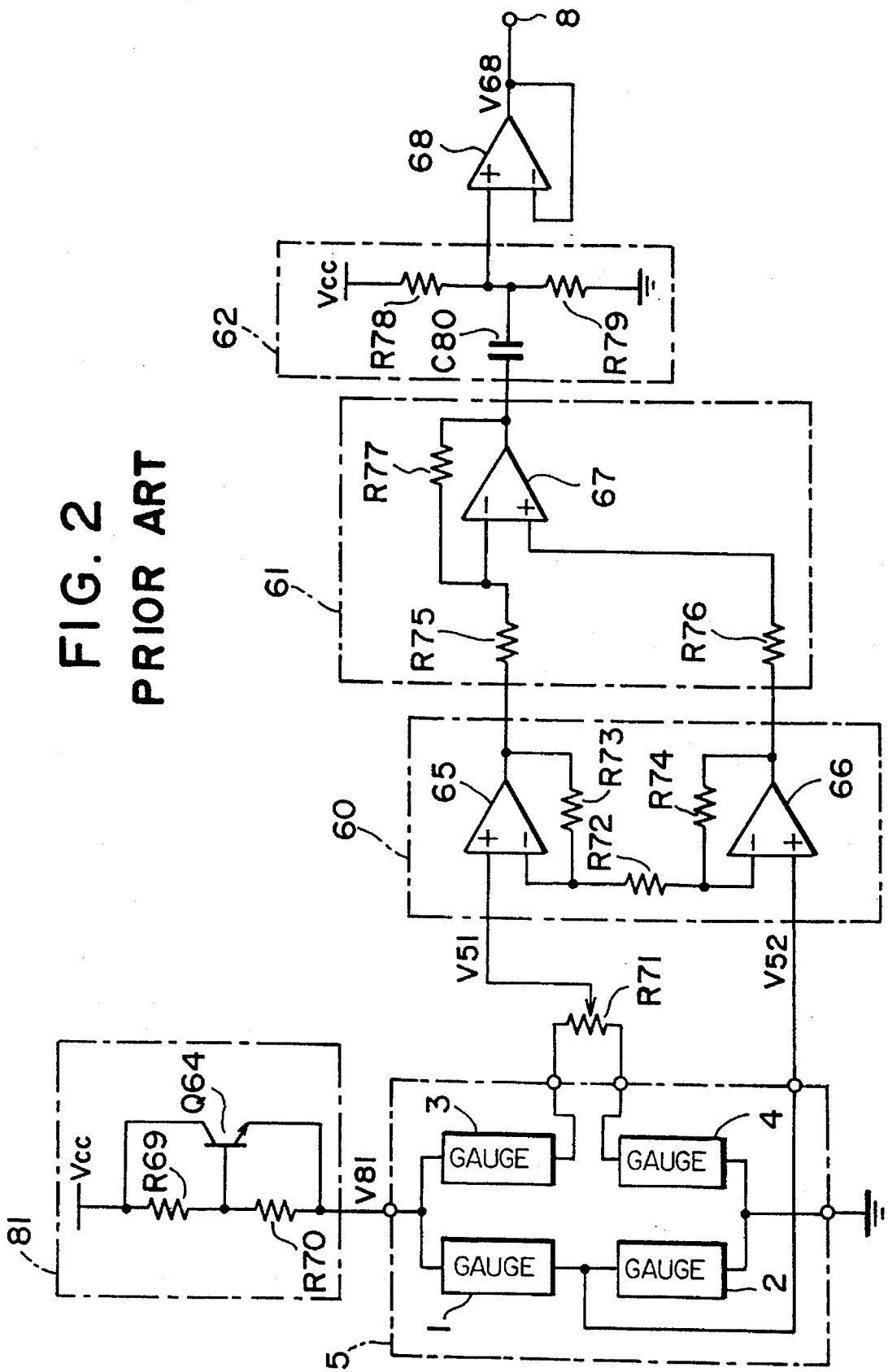
FIG. 2 is a circuit diagram for showing an example of a conventional strain sensor equipped with a compensation means for temperature dependency of detection sensitivity and a compensation means for temperature dependency of output voltages in the absence of signals.

Referring to FIG. 4, a circuit section which supplies a drive voltage to a Wheatstone bridge 5 will first be described. Resistors R30 to R32 and a transistor Q29, like the prior art strain sensor shown in FIG. 2, form a temperature-voltage converter 10 (i.e., temperature-dependent voltage generator), which generates a temperature-dependent voltage $V_{10}$ by making use of the temperature dependency of the base-emitter voltage of the transistor Q29. A constant voltage generator 11 generates a predetermined constant voltage $V_{11}$. A voltage divider 12, which has a series circuit of resistors R33 and R34 and a voltage follower of an operational amplifier 20, generates a voltage $V_{20}$ which is proportional to a power supply voltage $V_{CC}$. A voltage processor 13, which has an operational amplifier 21 and resistors R35 to R38, arithmetically processes the three different voltages $V_{10}$, $V_{11}$ and $V_{20}$ to obtain a resultant voltage $V_{13}$ which is supplied to the Wheatstone bridge 5.

Denoting the base-emitter voltage of the transistor Q29 by $V_{BE29}$ and the resistances of the resistors R31 and R32 by $R_{31}$ and $R_{32}$, the output voltage $V_{10}$ of the temperature-voltage converter 10 is given as follows:

$$V_{10} = \{(R_{31}+R_{32})/R_{32}\} \times V_{BE29} \tag{10}$$

Thus, it is possible to set the change in $V_{10}$ with temperature to a desired value by adjusting the resistance $R_{31}$.

Denoting the resistances of the resistors R35 to R38 by $R_{35}$, $R_{36}$, $R_{37}$ and $R_{38}$, and setting $R_{35}=R_{36}=R_{37}$, the Wheatstone bridge drive voltage $V_{13}$ generated by the voltage processor 13 is given as $$V_{13}=n_1 \times V_{20}+(n_1 \times V_{11}-n_2 \times V_{10}) \tag{11}$$

where $$n_1=\{1+(R_{38}/R_{35})\}/2, \; n_2=R_{38}/R_{35} \tag{12}$$

As is obvious from the equation (11), by preliminarily adjusting the voltages $V_{10}$ and $V_{11}$ at a predetermined ambient temperature such that $$V_{11}=(n_2/n_1) \times V_{10},$$

the Wheatstone bridge drive voltage $V_{13}$ at the predetermined ambient temperature is $V_{13}=n_1 \times V_{20}=kV_{CC}$ (k being a proportionality constant). Thus, a Wheatstone bridge drive voltage proportional to the power supply voltage $V_{CC}$ is obtainable. When the ambient temperature is changed, the voltage $V_{10}$ is changed. In this case, a voltage as a subtraction of a change portion of $(n_2 \times V_{10})$ given in the second term of the right side of the equation (11) from $(n_1 \times V_{20})$, is obtainable as the Wheatstone bridge drive voltage.

Figure 5:
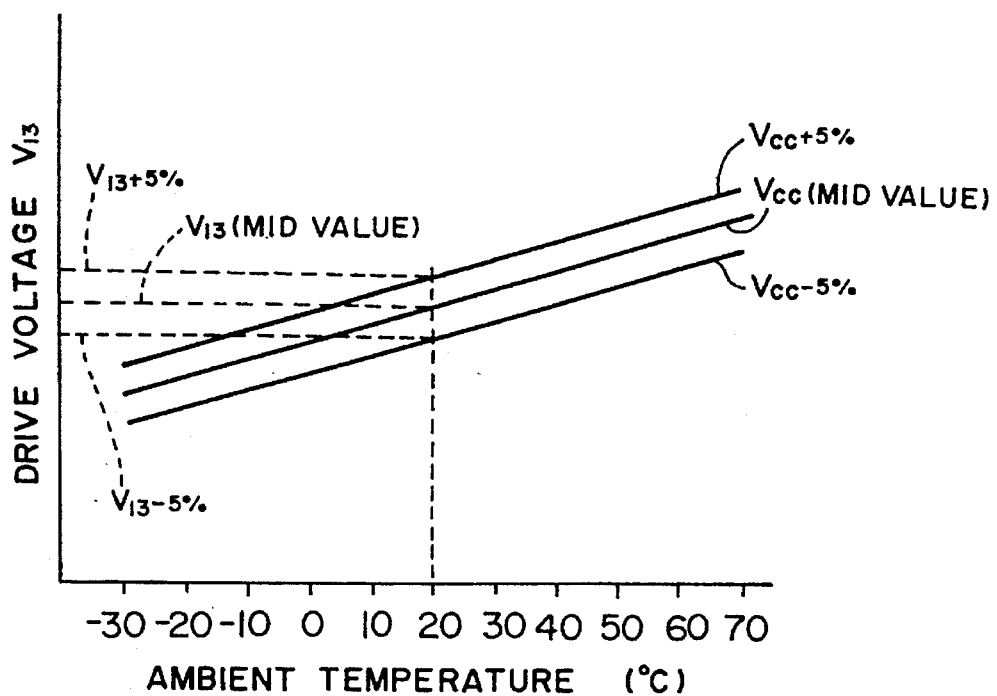
FIG. 5 is a diagram for showing temperature characteristics of output voltages of a voltage processor circuit shown in FIG. 4.

FIG. 5 shows the temperature dependency characteristic of the Wheatstone bridge drive voltage $V_{13}$ in the embodiment as described above. In FIG. 5, the ordinate is taken for the drive voltage for the Wheatstone bridge 5 (i.e., the output voltage $V_{13}$ of the voltage processor 13), and the abscissa is taken for the ambient temperature of the sensor. Referring to FIG. 5, in this embodiment an increase of the power supply voltage $V_{CC}$ by, for instance, 5% at an ambient temperature of 20° C. increases the drive voltage $V_{13}$ also by 5%. On the other hand, a change in the power supply voltage $V_{CC}$ by −5% causes a corresponding reduction of the drive voltage $V_{13}$ by 5%. It will be seen that in this embodiment the drive voltage $V_{13}$ is proportional to the power supply voltage $V_{CC}$ at the temperature of 20° C. Also, with ambient temperature changes a positive temperature dependency characteristic is provided, which is determined by the temperature coefficient of the output voltage $V_{10}$ of the temperature-voltage converter 10.

The temperature-voltage converter which is used according to the invention is not limited to the one shown in FIG. 4. For example, the temperature-voltage converter 81 used in the prior art strain sensor described earlier (see FIG. 2) can be used according to the invention because it provides a voltage having a positive temperature dependency characteristic. In this case, however, with the voltages $V_{81}$ and $V_{10}$, their temperature coefficients are opposite in terms of their polarities as is obvious from the comparison of the equations (4) and (10), and this means that it is necessary to change the inputs to the operational amplifier 21.

As shown, according to the present invention, a desired voltage value proportional to the power supply voltage may be used as the Wheatstone bridge drive voltage, and it is possible to readily obtain Wheatstone bridge drive voltages having various temperature dependency characteristics.

Now, the amplifier circuit section in FIG. 4 will be described. Referring to FIG. 4, a first amplifier stage 14, which has operational amplifiers 22 and 23 and resistors $R_{40}$, $R_{41}$ and $R_{42}$, is an instrumentation amplifier similar to that in the prior art strain sensors. Its voltage amplification factor $G_{14}$ is, denoting the resistances of the resistors R40 to R42 by $R_{40}$, $R_{41}$ and $R_{42}$, $$G_{14}=(R_{40}+R_{41}+R_{42})/R_{40} \tag{13}$$

The resistor R39 is an adjustment resistor for adjusting the output voltage of the Wheatstone bridge 5 in the absence of signal at a predetermined initial ambient temperature to 0 V.

Figure 6:
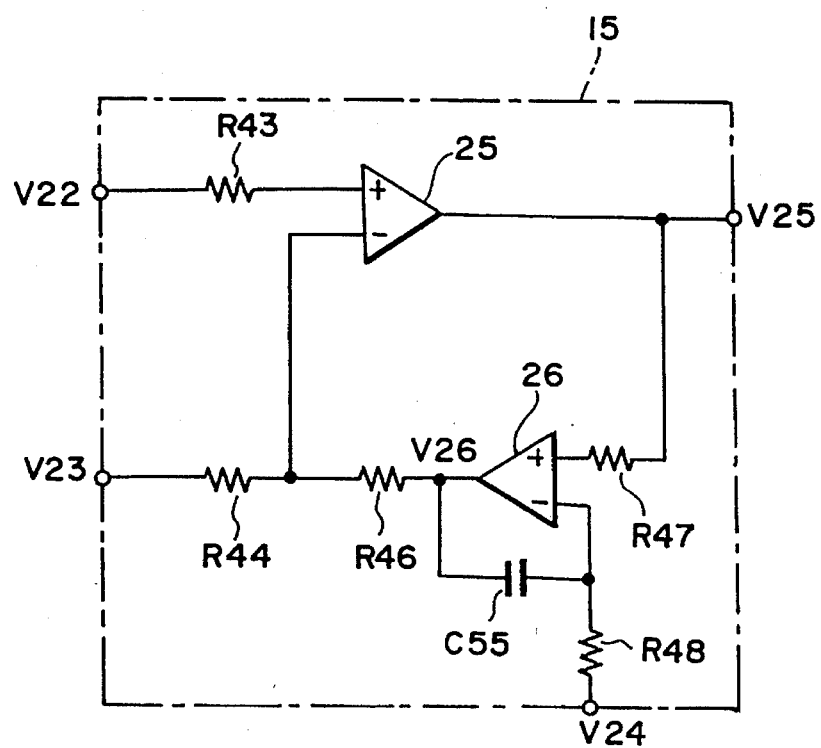
FIG. 6 is a circuit diagram for showing an amplifier circuit 15 taken from the circuit shown in FIG. 4.

Now, another amplifier stage, that is, a second amplifier stage 15, which has operational amplifiers 25 and 26, resistors R43, R44 and R46–R48 and a capacitor C55, will be described in connection with its amplification factor characteristic with reference to FIG. 6. Referring to FIG. 6, the DC output voltage $V_{25}$ of the second amplifier stage 15 in the steady state thereof is $$V_{25}=V_{24} \tag{14}$$

if the off-set voltages of the operational amplifiers 25 and 26 can be ignored. As the input $V_{24}$ to the amplifier stage 15 one output $V_{52}$ of the Wheatstone bridge 5 is supplied through the voltage follower formed by the operational amplifier 24. Thus, the off-set temperature variations of the output of the Wheatstone bridge 5 are propagated without being amplified through the amplifier stages 14 and 15 to a final amplifier stage 16 and subjected to compensation therein such that they will not appear at the strain sensor output terminal 8 as will be described later.

Further, denoting the resistances of the resistors R44 and R46 by $R_{44}$ and $R_{46}$, the DC output voltage $V_{26}$ of the operational amplifier 26 in the steady state is given as follows:

$$V_{26}+\{R_{46}/(R_{44}+R_{46})\} \cdot (V_{23}-V_{26})=V_{22}$$

Thus, the DC output voltage $V_{26}$ will be $$V_{26}=V_{22}+(R_{46}/R_{44}) \cdot (V_{22}-V_{23}) \tag{15}$$

On the other hand, as for the voltage amplification factor in the AC operation of the operational amplifier 25, AC signal components +v and −v are added to the DC voltages $V_{22}$ and $V_{23}$, respectively, so far as the AC operation only is concerned. In this instance, denoting the AC component of the voltage $V_{26}$ at the output terminal of the operational amplifier 26 by $v_{26}$, the AC component of the voltage $V_{25}$ at the output terminal of the operational amplifier 25 by $v_{25}$, the electrostatic capacitance of the capacitor C55 by $C_{55}$ and the resistance of the resistor R48 by $R_{48}$, there will be obtained the following:

$$v + \frac{R_{44}}{R_{44}+R_{46}} \cdot (v_{26}+v) = v \tag{16}$$

-continued $$\frac{R_{48}}{R_{46}+\frac{1}{j\omega C_{55}}} \cdot \left(v_{25}+\frac{v}{G_{14}}\right) - \frac{v}{G_{14}} = v_{25} \quad (17)$$

From the above equation (16), there will be obtained:

$$R_{44} \cdot v_{26} + R_{44} \cdot v = 2 \cdot v(R_{44}+R_{46})$$

and $v_{26} = \{(R_{44}+2 \cdot R_{46})/R_{44}\} \cdot v$ \quad (18)

Further, from the equation (17), there will be obtained:

$$v_{25} = \left(1 + \frac{1}{j\omega C_{55} \cdot R_{48}}\right)\left(v_{25}+\frac{v}{G_{14}}\right) - \frac{v}{G_{14}} \quad (19)$$

From the above equations (18) and (19), $$\frac{R_{44}+2R_{46}}{R_{44}} \cdot v = \left(1+\frac{1}{j\omega C_{55} \cdot R_{48}}\right)\left(v_{25}+\frac{v}{G_{14}}\right) - \frac{v}{G_{14}}$$

Thus, $$\left(1+\frac{1}{j\omega C_{55} \cdot R_{48}}\right) v_{25} =$$

$$\left(\frac{R_{44}+2R_{46}}{R_{44}} = \frac{1}{j\omega C_{55} \cdot R_{48}} \cdot \frac{1}{G_{14}}\right) \cdot v$$

From the above, the amplification factor $G_{15}$ of the second amplifier stage 15 is given as $$G_{15} = \frac{v_{25}}{2v} \quad (20)$$

$$= \frac{1}{2} \cdot \frac{1}{1+\frac{1}{j\omega C_{55} \cdot R_{48}}} \cdot \frac{R_{44}+2R_{46}}{R_{44}} -$$

$$\frac{1}{2} \cdot \frac{1}{1+j\omega C_{55} \cdot R_{48}} \cdot \frac{1}{G_{14}}$$

Since it can be regarded in a sufficiently high frequency region that $$1/(j\omega C_{55} \cdot R_{48}) = 0$$

the amplification factor $G_{15}$ in this instance is $$G_{15} = (R_{44}+2 \cdot R_{46})/(2 \cdot R_{44}) \quad (21)$$

Now, the frequency characteristic of the second amplifier stage 15 will be described. From the above equation (20), it will be seen that when the frequency is reduced the term of $1/(j\omega C_{55} \cdot R_{48})$ in this amplifier stage can no longer be ignored, so that the gain is reduced accordingly. At the frequency $f_{CL15}$ at which the amplification factor is $1/\sqrt{2}$, from the relation $|1+1/(j\omega C_{55} \cdot R_{48})| = \sqrt{2}$, there will be given $$j\omega C_{55} \cdot R_{48} = 1$$

and $f_{CL15} = 1/(2\pi C_{55} \cdot R_{48})$ \quad (22)

Thus, by appropriately selecting the electrostatic capacitance $C_{55}$ and the resistance $R_{48}$, it is possible to obtain a desired low frequency amplification characteristic that is required for the strain sensor.

Now, the transient response characteristic when the power source is turned on will be described. In order for the charge stored in the capacitor C55 to become the steady state when the power source is turned on, the capacitor C55 has to be charged through the resistor R48. To this end, a time is necessary, which is determined by the electrostatic capacitance of the capacitor C55 and the resistance of the resistor R48. Taking, for instance, a strain sensor which is required to detect a low frequency signal down to 1 Hz, the time required until stabilization of operation after the power source is turned on is about 0.5 seconds or above with $C_{55}=1$ µF, $R_{48}=160$ kΩ.

In the embodiment shown in FIG. 4, the voltages $V_{51}$ and $V_{52}$ at the output terminals of the Wheatstone bridge 5 may be made substantially equal by adjusting the resistor R39 and, thus, the voltages $V_{22}$ and $V_{23}$ may be made equal. From the equation (15), $$V_{26} = V_{22}$$

while, $$V_{24} = V_{52} = V_{51} V_{22}, \text{ so that}$$

$$V_{26} = V_{24} \quad (23)$$

Thus, the potentials at both the terminals of the capacitor C55 are made equal. That is, the time for the charging of the capacitor after the turning-on of the power source becomes unnecessary. Of course the Wheatstone bridge output voltage in the absence of signal varies with temperature, and therefore the condition $V_{51}=V_{52}$ is no longer satisfied when the temperature varies even if the condition could be initially obtained by adjustment. However, changes in the steady state potentials at both the terminals of the capacitor with the temperature variations are slight. In experiments conducted by the inventor, the operation stabilization time at the time of the turning-on of the power source was 0.1 second or below in a temperature range of $-40°$ C. to $+85°$ C.

The amplifier stage 16, including amplifiers 27 and 28, is provided for determining the output voltage of the strain sensor in the absence of signal. Denoting the resistances of the resistors R49 to R54 respectively by $R_{49}$, $R_{50}$, $R_{51}$, $R_{52}$, $R_{53}$ and $R_{54}$, the DC output voltage $V_{27}$ of the amplifier stage 16 is $$\frac{R_{49}}{R_{49}+R_{52}} \cdot (V_{27}-V_{25}) + V_{25} = \quad (24)$$

$$\frac{R_{51}}{R_{50}+R_{51}} \cdot \left(\frac{R_{54}}{R_{53}+R_{54}} \cdot V_{CC} - V_{24}\right) + V_{24}$$

Thus, by setting all the resistances R49 to R52 to be equal, the following equation is derived $$\frac{1}{2} \cdot (V_{27}+V_{25}) = \frac{1}{2} \cdot \left(\frac{R_{54}}{R_{53}+R_{54}} \cdot V_{CC}+V_{24}\right)$$

Thus, $$V_{27} = \{R_{54}/(R_{53}+R_{54})\} \cdot V_{CC} + V_{24} - V_{25} \quad (25)$$

Since $V_{24}=V_{25}$ from the equation (14), $$V_{27} = \{R_{54}/(R_{53}+R_{54})\} \cdot V_{CC} \quad (26)$$

This means that the output off-set voltage variations of the Wheatstone bridge 5 do not appear at the output terminal 8 at all. That is, the output voltage at the output terminal 8 in the absence of signal is a voltage as a result of the division of the circuit power supply voltage $V_{CC}$ by the resistors R53 and R54.

As has been described in the foregoing, the drive circuit for the strain sensor according to the invention generates a Wheatstone bridge drive voltage, which is proportional to the power supply voltage at a predetermined temperatures and has a predetermined value corresponding to a temperature change when such temperature change takes place, through arithmetic processing of a voltage having a temperature dependency characteristic with respect to temperature changes, a predetermined constant voltage and a voltage proportional to the power supply voltage.

In addition, the amplifier circuit for the strain sensor according to the invention is constructed such that the potentials at both the terminals of the capacitor concerning the AC coupling are equal in its steady state.

With the strain sensor using semiconductor strain gauges according to the invention, since the strain gauges have temperature dependency characteristics, the temperature dependency of the detection sensitivity is compensated for and the detection sensitivity is made proportional to the power supply voltage. Also, since the AC coupled amplifier circuit is used, any off-set voltage variations of the Wheatstone bridge can be canceled and this enables to reduce the time required until the stabilization of the operation after the power source is turned-on.

While the invention has been described in its preferred embodiment, the words which have been used are words of description rather than limitation and changes within the purview of the appended claims may be made without departing from the true scope and spirit of the invention.

What is claimed is:

1. A strain sensor including a drive circuit for driving a Wheatstone bridge formed by semiconductor strain gauges, said drive circuit comprising:

a temperature-dependent voltage generator for generating and outputting a voltage having a predetermined ambient temperature dependency characteristic;

a constant voltage generator for generating and outputting a predetermined constant voltage;

a proportional voltage generator for generating and outputting a voltage proportional to an externally supplied power source voltage; and a voltage processor for receiving and arithmetically processing respective voltages of said temperature-dependent voltage generator, said constant voltage generator and said proportional voltage generator, and for outputting a drive voltage satisfying a following relation $n_1 \cdot V_D + n_2 \cdot V_R - n_3 \cdot V_T,$ in which $n_1$, $n_2$ and $n_3$ are positive constants, and $V_D$, $V_R$ and $V_T$ are respectively said output voltages from said proportional voltage generator, said constant voltage generator and said temperature-dependent voltage generator, said drive voltage of said voltage processor being supplied between two voltage supply points of said Wheatstone bridge, with a relation $n_2 \cdot V_R = n_3 \cdot V_T$ being satisfied when said semiconductor strain gauges are at a predetermined temperature.

2. The strain sensor according to claim 1, in which said temperature-dependent voltage generator includes a first, a second and a third resistor connected in series between a terminal receiving said power source voltage and ground, and a bipolar transistor having a collector connected to a first junction node between said first and second resistors, a base connected to a second junction node between said second and third resistors, and an emitter connected to the ground, and said temperature-dependent voltage generator outputs at said first junction node a voltage proportional to a base-emitter voltage of said bipolar transistor.

3. The strain sensor according to claim 1, in which said temperature-dependent voltage generator includes a first and a second resistor connected in series, and a bipolar transistor having a collector connected together with a first end of said first resistor to a terminal receiving said power source voltage, a base connected to a second end of said first resistor and also to a first end of said second resistor, an emitter connected to a second end of said second resistor, and said temperature-dependent voltage generator outputs at the emitter of said bipolar transistor a voltage proportional to a base-emitter voltage of said bipolar transistor.

4. The strain sensor according to claim 1, in which said proportional voltage generator includes a first and a second resistor connected between a terminal receiving said power source voltage and a ground, and an operational amplifier serving as a voltage-follower.

5. A strain sensor including an amplifier circuit for amplifying a strain output signal from a Wheatstone bridge formed by semiconductor strain gauges, said amplifier circuit comprising:

a first operational amplifier for receiving a voltage supplied to a first input terminal of said amplifier circuit as an input to one input terminal thereof;

a second operational amplifier for receiving a voltage at an output terminal of said first operational amplifier as an input to one input terminal thereof;

a DC voltage divider for dividing a voltage between a second input terminal of said amplifier circuit and an output terminal of said second operational amplifier in a constant voltage division ratio irrespective of frequencies;

an AC voltage divider including a series circuit having a resistor connected to a third input terminal of said amplifier circuit and a capacitor connected to the output terminal of said second operational amplifier, for dividing a voltage between the third input terminal and the output terminal of the second operational amplifier with frequency dependency; and a third operational amplifier for receiving an input voltage supplied to said third input terminal as an input to a non-inverting input terminal, said third operational amplifier outputting at an output terminal thereof a voltage which is fed-back to an inverting input terminal thereof through a resistor, said Wheatstone bridge outputting, between two voltage detection points, said strain output signal which is amplified, the voltage at the voltage division point of said DC voltage divider being supplied as an input to the other input terminal of said first operational amplifier, the voltage at the voltage division point of said AC voltage divider being supplied as an input to the other input terminal of said second operational amplifier, the voltage at one of the voltage detection points of said Wheatstone bridge being supplied to the first input terminal, the voltage at the other voltage detection point of said Wheatstone bridge being supplied to the second and third input terminals, and the voltage at the output terminal of said first operational amplifier being supplied as an input to an inverting input terminal of said third operational amplifier so that an output voltage of said strain sensor is outputted from the output terminal of said third operational amplifier.

6. The strain sensor according to claim 5, in which the voltage between the voltage detection points of the Wheatstone bridge is inputted through an instrumentation amplifier and a voltage-follower to the first to third input terminals of said amplifier circuit, instead of being inputted directly thereto, said instrumentation amplifier including a fourth operational amplifier, in which the output voltage at its output terminal is fed to said first input terminal of said amplifier circuit and is fed-back through a resistor to an inverting input terminal thereof, and a fifth operational amplifier, in which the voltage at its output terminal is fed to said second input terminal of said amplifier circuit and is fed-back through a resistor to an inverting input terminal thereof, the inverting input terminals of the fourth and fifth operational amplifiers being connected to each other via a resistor, said voltage-follower including a sixth operational amplifier, in which the voltage at its output terminal is fed-back to an inverting input terminal and is also fed to the third input terminal of the amplifier circuit, and the voltage at one of the voltage detection points of the Wheatstone bridge being supplied as an input to a non-inverting input terminal of said fourth operational amplifier, the voltage at the other voltage detection point being supplied as an input to a non-inverting input terminal of each of the fifth and sixth operational amplifiers.

7. A strain sensor comprising a Wheatstone bridge having semiconductor strain gauges, a drive circuit for supplying a drive voltage between two voltage supply points of the Wheatstone bridge, and an amplifier circuit for amplifying a strain output signal outputted between two voltage detection points of the Wheatstone bridge, said Wheatstone bridge being adjustable such that the voltages at the two voltage detection points are equal, said drive circuit comprising:

a temperature-dependent voltage generator for generating and outputting a voltage having a predetermined ambient temperature dependency characteristic;

a constant voltage generator for generating and outputting a predetermined constant voltage;

a proportional voltage generator for generating and outputting a voltage proportional to an externally supplied power source voltage; and a voltage processor for receiving and arithmetically processing respective voltages of said temperature-dependent voltage generator, said constant voltage generator and said proportion voltage generator, and for outputting a drive voltage satisfying a following equation $$n_1 \cdot V_D + n_2 \cdot V_R - n_3 \cdot V_T,$$

in which $n_1$, $n_2$ and $n_3$ are positive constants, and $V_D$, $V_R$ and $V_T$ are respectively said output voltages from said proportional voltage generator, said constant voltage generator and said temperature-dependent voltage generator, said drive voltage of said voltage processor being supplied between two voltage supply points of said Wheatstone bridge, with a relation $$n_2 \cdot V_R = n_3 \cdot V_T$$

being satisfied when said semiconductor strain gauges are at a predetermined temperature; and wherein said proportional voltage generator includes a first and a second resistor connected between a terminal receiving said power source voltage and a ground, and an operational amplifier serving as a voltage-follower.

\* \* \* \* \*

UNITED STATES PATENT AND TRADEMARK OFFICE
CERTIFICATE OF CORRECTION

PATENT NO.   : 5,460,050
DATED        : October 24, 1995
INVENTOR(S)  : Soichiro MIYANO It is certified that error(s) appears in the above-identified patent and that said Letters Patent is hereby corrected as shown below:

Col. 1, line 65, delete "AR", insert --$\Delta$R--.

Col. 8, line 66, delete "v+", insert -- -v+--.

Col. 9, line 28, delete "=", insert -- - --.

Col. 9, line 40, before "½", insert -- - --.

Col. 9, line 55, delete both occurrences of "=2", insert with --$\sqrt{2}$--.

Signed and Sealed this

Twenty-first Day of May, 1996

Attest:

BRUCE LEHMAN

*Attesting Officer*   *Commissioner of Patents and Trademarks*